United States Patent [19]

Butts et al.

[11] Patent Number: 4,918,426
[45] Date of Patent: Apr. 17, 1990

[54] METHOD AND APPARATUS FOR SENSING FLUID FLOW VOLUME TO INDICATE END OF FILTER LIFE

[75] Inventors: Lawrence D. Butts, Wyoming; Thomas A. Niezgoda, Kentwood, both of Mich.

[73] Assignee: Amway Corporation, Ada, Mich.

[21] Appl. No.: 189,342

[22] Filed: May 2, 1988

[51] Int. Cl.⁴ .............................................. G08B 21/00
[52] U.S. Cl. .................................. 340/611; 340/457; 73/861.63
[58] Field of Search ................ 340/52 D, 606, 607, 340/608, 609, 610, 611; 210/87, 88, 89; 73/861.63, 861.42, 717, 754, DIG. 4, 861.44

[56] References Cited

U.S. PATENT DOCUMENTS

| | | | |
|---|---|---|---|
| 2,487,679 | 11/1949 | Stover | 73/861.43 |
| 3,208,278 | 9/1965 | Herreman | 73/183 |
| 3,391,575 | 7/1968 | Howe et al. | 73/861.02 |
| 3,635,083 | 1/1972 | Vaughn | 73/861.43 |
| 3,714,828 | 2/1973 | Durkin | 73/861.19 |
| 3,889,534 | 6/1975 | Grant | 73/861.19 |
| 4,121,199 | 10/1978 | Young | 340/611 |
| 4,154,586 | 5/1979 | Jones et al. | 55/274 BN |
| 4,361,050 | 11/1982 | Coussot et al. | 73/DIG. 4 X |
| 4,406,291 | 9/1983 | Schwesinger | 73/861.43 X |
| 4,431,533 | 2/1984 | Wrede | 210/87 |
| 4,522,077 | 6/1985 | Koberle | 73/861.63 |
| 4,526,041 | 7/1985 | Beller et al. | 73/861.47 |
| 4,623,451 | 11/1986 | Oliver | 210/87 |
| 4,769,135 | 9/1988 | Norton | 210/88 |

Primary Examiner—Joseph A. Orsino
Assistant Examiner—Jeffery A. Hofsass
Attorney, Agent, or Firm—Michael A. Mohr

[57] ABSTRACT

A method and solid-state electronic flowmeter with no moving parts is provided for monitoring instantaneous and/or accumulated fluid flow. A preferred application for the method and flowmeter is the measurement of the total volume of filtered fluid in a fluid treatment system as an indication of end of life for a filter therein. The flowmeter employs a solid-state transducer which senses differential pressure generated by a flow restriction such as a venturi which varies depending on a rate of flow. The transducer output in integrated over time to provide a representation of total fluid flow through the filter. The meter is preferably compact and battery-powered to facilitate ease of installation and use. Battery power is conserved by periodically energizing the transducer during idle periods and by periodically energizing the end of life indicator during and end of life condition.

21 Claims, 2 Drawing Sheets

METHOD AND APPARATUS FOR SENSING FLUID FLOW VOLUME TO INDICATE END OF FILTER LIFE

BACKGROUND OF THE INVENTION

The present relates in general to methods and devices for monitoring accumulated fluid flow and more sepcifically to methods and devices for indicating an end of life condition for a filter in a fluid treatment system.

Filters used for removing impurities from fluids such as water and air typically have limited useful lifetime after which the filter can no longer effectively remove impurities from the fluid. For example, a charcoal filter can be used to remove organic contaminants from drinking water by adsorption wherein the contaminants adhere in thin layers on the surface of the charcoal. When the filter has adsorbed contaminants to its full capacity, it has reached an end of life condition. Filter replacement is then required in order to ensure the quality of the filtered fluid.

There are several ways to determine when a filter has reached its end of life condition. For example, in U.S. Pat. No. 4,431,533 to Wrede, a battery-operated light is turned on every time water is run through a filter. The battery is sized to wear out at a time comparable to the ordinary useful lifetime of the filter. Quality testing of the filtered fluid would be the most accurate method, but is too expensive and inconvenient for many applications. In some cases, it is possible to detect the fluid pressure difference on opposite sides of the filter as an indication of end of life. However, an adsorption filter does not create a significant pressure drop when filled to capacity since there is no obstruction by a build up of residue. Therefore, the quantity of accumulated fluid flow is a preferred method for determining end of life in many fluid treatment situations such as in consumer applications.

To find the accumulated fluid volume requires a knowledge of instantaneous rate of fluid flow. In U.S. Pat. No. 4,522,077 to Koberle, differential pressure across a venturi disposed in a fluid flow line is used to apply force to a magnetic armature. The resulting displacement of the armature is sensed and is used to generate a magnetic force required to cancel the displacement. Integration of the total armature displacement over time is used to find the instantaneous flow rate of fluid.

In U.S. Pat. No. 4,526,041 to Beller et al, vacuum pressure generated by a venturi is used to create oscillatory movement of a flag. The flag interrupts the light path of an optical interrupter at a rate which is proportional to the rate of fluid flow. The instantaneous flow rate is calculated and is integrated to determine the amount of fluid entering a container. When a desired volume of fluid is attained, a solenoid valve is actuated to terminate fluid flow.

The above-mentioned patents require the use of complicated mechanical structures in determining fluid flow rate and accumulated volume. This complexity results in expensive and less reliable devices.

U.S. Pat. No. 4,406,291 to Schwesinger teaches apparatus for measuring volumes of gases wherein a driving gas is passed through a venturi to create a first pressure. A gas with an unknown volume is drawn into the venturi by the vacuum generated by the venturi from a chamber where the gas of unknown volume is collected. The introduction of the unknown gas creates a change in the first pressure which is sensed to provide an indication of flow rate, which may be integrated to find volume. However, it is disadvantageous to provide a source of driving fluid due to added complexity, cost and size.

Accordingly, it is a principal object of the present invention to provide a method for indicating end of life of a filter based on accumulated fluid volume.

It is another object of the present invention to indicate end of life of a filter without employing any moving parts.

It is yet another object of the invention to provide a method for indicating end of life of the filter simply and reliably and in a manner which minimizes power consumption by the measuring device'

It is a further object of the invention to provide an apparatus for indicating end of life of a filter which is compact, simple and reliable solid-state flow meter which has no moving parts.

SUMMARY OF THE INVENTION

These and other objects are achieved in a method for indicating the operating condition of an impurity filter receiving a variable fluid flow having the steps of (1) generating a pressure differential proportional to the instantaneous rate of fluid flow, (2) generating a signal proportional to the pressure differential by means of a pressure sensor, (3) integrating the signal as a representation of the total volume of fluid having passed through the filter, and (4) activating an indicator when the magnitude of the representation has advanced to a value corresponding to a predetermined volume of fluid to be filtered. The signal generating step is preferably conducted only at spaced intervals during periods when the pressure differential is below a predetermined threshold value and is preferably conducted continuously when the pressure differential is above the predetermined threshold value.

In another aspect of the invention, an apparatus for indicating end of life of an impurity adsorption filter for receiving a variable fluid flow comprises pressure means, a piezoelectric differential pressure transducer, voltage to frequency converter means, counter means and annunciator means. The pressure means is adapted to contact the fluid flow for generating a pressure differential which is proportional to the instantaneous rate of fluid flow. The transducer is exposed to the pressure differential and generates a voltage signal proportional to the instantaneous rate of flow. The voltage to frequency converter means is coupled to the transducer for generating a pulse signal having a frequency proportional to the magnitude of the voltage signal. The counter means is coupled to the voltage to frequency converter means for storing a count representing the total volume of fluid having flowed to the filter and for producing an output signal when the count has advanced to a predetermined count. The annunciator means is responsive to the output signal for generating a humanly perceptible signal to indicate end of life of the filter.

In a further aspect of the invention, there is provided an apparatus for monitoring accumulated fluid flow therethrough by sensing an integrating differential pressure proportional to the rate of fluid flow. The apparatus comprises: a housing means for conducting a variable fluid flow therethrough; means having no moving parts located within said housing means for generating a pressure differential proportional to the instantaneous rate of flow of said fluid through said housing means; solid-state electronic means for producing a value representing the total volume of fluid having flowed through said housing by integrating said pressure differential over time; solid-state electronic means for producing an output signal when said value exceeds a predetermined value; and indicator means responsive to said output signal for generating a humanly perceptible signal in response to said output signal. In this apparatus, the means for generating a pressure differential includes a solid-state piezoelectric transducer. The apparatus is preferably run on a battery within the housing means which supplies electrical power to the apparatus, so that the apparatus can operate without being externally supplied with electricity. To conserve the battery power, the apparatus preferably further comprises timer means for activating the means for generating the pressure differential at spaced intervals, thereby reducing the total energy required to operate the apparatus. However, the apparatus preferably also includes threshold means for continuously enabling said means for generating a pressure differential when the instantaneous rate of flow is detected as being above a predetermined value. Finally, low battery detector means are preferably included within the apparatus for providing a warning signal to the indicator means when the voltage from the battery is below a specified voltage, so that the indicator means may generate a humanly perceptible signal, thereby providing a warning of the low battery condition.

In one more aspect of the invention, there is provided a method for indicating the volume of the variable fluid flow through an orifice, which comprises the steps of: (a) generating differential proportional to the instantaneous rate of fluid flow through the orifice; (b) generating an electrical signal which is a function of the pressure differential; (c) integrating the electrical signal to provide a representation of the total volume of fluid having passed through the orifice; and (d) indicating the magnitude of such representation. As will be more fully explained hereafter, step (d) may be performed by activating a humanly perceptible indicator when the magnitude of the representation has advanced to a value corresponding to a predetermined volume of fluid. This method may further comprise the step of passing the fluid flow through an impurity filter located in series with an in relatively close proximity to the orifice.

In one other aspect of the invention, a novel technique for monitoring instantaneous fluid flow, is provided. The pressure differential across a fluid resistor such as an orifice is applied to a solid-state piezoelectric transducer which provides a voltage output proportional to the instantaneous rate of fluid flow through the orifice.

BRIEF DESCRIPTION OF THE DRAWINGS

The novel features of the invention are set forth with particularity in the appended claims. The invention itself, as to organization and process thereof, together with further objects and advantages thereof, may best be understood by reference to the following detailed description in conjunction with the accompanying drawings in which:

DETAILED DESCRIPTION OF THE INVENTION

Figure 1:
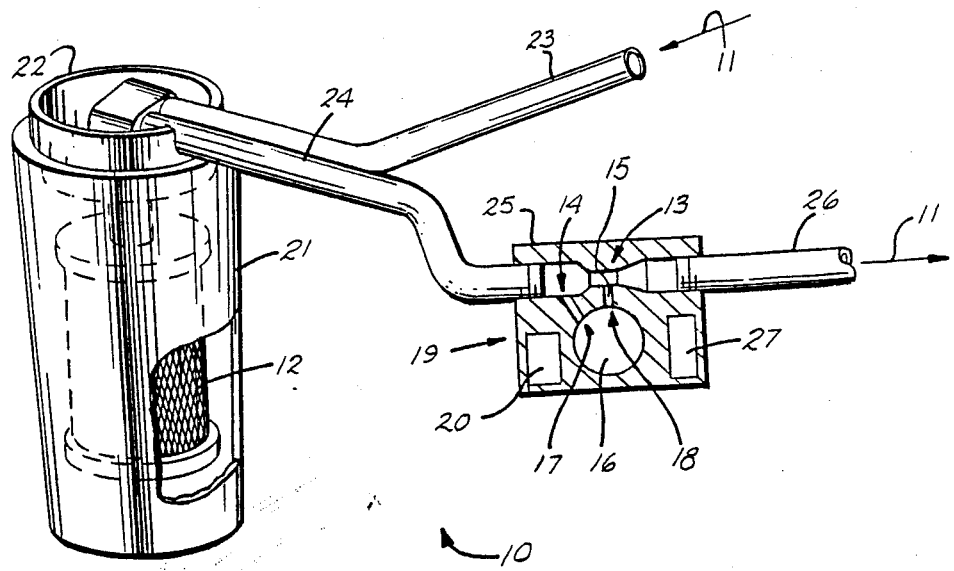
FIG. 1 is part cross-sectional, part block diagram of a fluid treatment device according to the present invention.

Referring now to FIG. 1, a preferred embodiment of the present invention, namely water purification system 10, is shown. System 10 includes a removable canister 21 and base portion 22 to which is connected influent tube 23 and effluent tube 24, through which water fluid flow indicated by arrows 11 passes. Within the canister 21, which may be threaded or otherwise removably fastened onto the base portion 22, is a replaceable filter cartridge 12. The liquid to be filtered (which is typically water but may be other substances) passes through cartridge 12 on its way from tube 23 to tube 24. One suitable construction for the canister 21, base portion 22, and filter cartridge 12 is shown in commonly assigned, copending U.S. patent application Ser. No. 849,167 filed on Apr. 7, 1986 and entitled "Water Filter," the disclosure of which is hereby incorporated by reference.

In operation, the flow of the filtered liquid increases in velocity when passing through orifice 13 continuously producing a constant pressure differential between passages 14 and 15 the magnitude of which proportional to the rate of fluid flow. The pressure differential is sensed by transducer 16 which may be a piezoelectric transducer and which generates a differential voltage whose magnitude is proportional to the magnitude of the pressure differential. This voltage signal is integrated by electronics 20 to represent the total volume of liquid which is passed through filter 12. Electronics 20 includes an end of life indicator which is activated when the magnitude of the volume representation advances to a value corresponding to the predetermined volume of fluid to be filtered by filter 12. The indicator can be either visual or audible, or both.

In the FIG. 1 embodiment, the fluid flow monitoring apparatus 19 is in a housing 25, which may be a corrosion-resistant mental, plastic, or any suitable synthetic material, or combinations of the materials. The apparatus 19 is located downstream of the filter 12. The outlet tube 26 leads to a faucet or other discharge port for the fluid flowing through filter 12 and the orifice or flow constriction 13, whose accumulated volume is monitored by sensor 16 and electronics 20 within the housing 25. Within the housing 25 is a small conventional battery 27 for providing electrical power to the electronics 20. The effluent tube 24 and outlet tube 26 may be threaded into or otherwise suitably fastened in a leak-proof manner to the housing 25 in a manner which allows the flow meter 19 to be mounted remotely, preferably at some reasonable distance from, but still in relatively close proximity to, the filter 12. If desired, the apparatus 19 could also be reconfigured so as to be mounted on or within a suitably constructed base portion similar to base portion 22. Those in the art will appreciate that the compact flow meter 19 can also be used for monitoring accumulated fluid flow in application which do not involve filtering.

Figure 2:
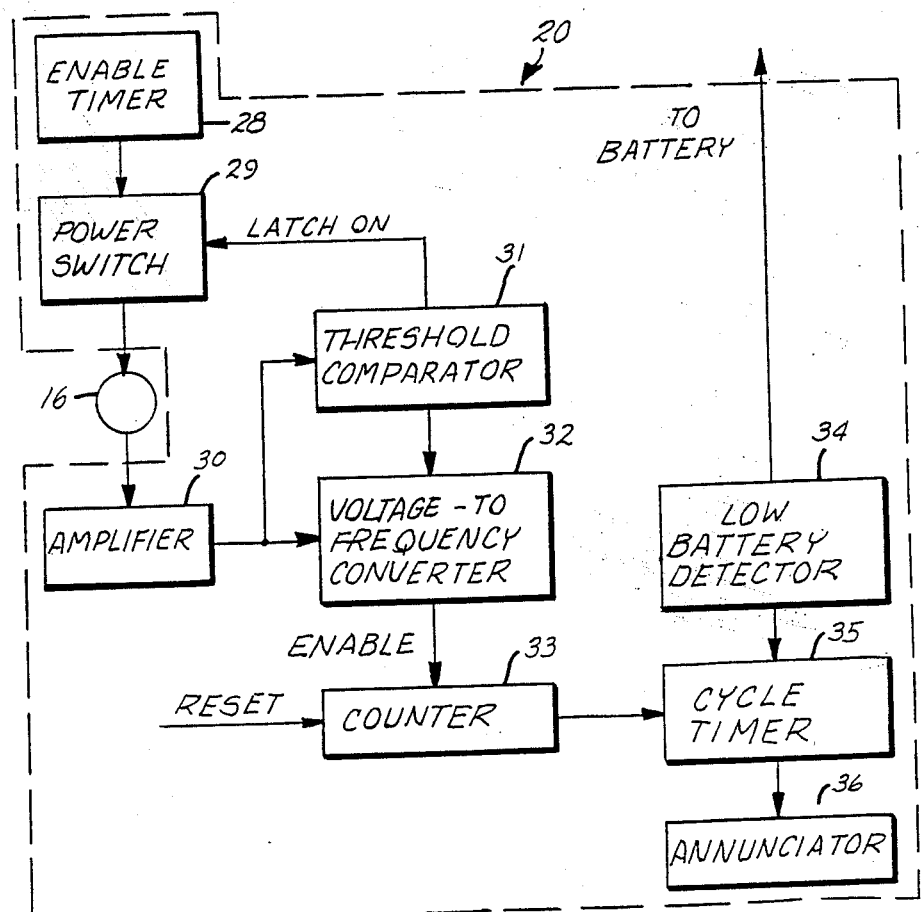
FIG. 2 is a block diagram of a preferred embodiment of electronic control circuitry according to the present invention.

Turning now to FIG. 2, a preferred embodiment for electronics 20 is shown in greater detail. An enable timer 28 provides pulses at spaced intervals to power switch 29. Power switch 29 energizes transducer 16 in response to the timed pulses from timer 28. The signal from transducer 16 is amplified by an amplifier 30. The amplifier signal is provided to a threshold comparator 31 which generates a latch-on signal provided to power switch 29 and an enable signal provided to a voltage-to-frequency converter 32 when the amplifier signal exceeds a threshold value. The amplifier signal is also provided to voltage-to-frequency converter 32. The output of converter 32 is provided to a counter 33 which counts the pulses in the converter signal. Counter 33 is also independently resettable by a reset signal. A cycle timer 35 is activated by signals from counter 33 or a low battery detector 34. The output of cycle timer 35 is connected to an annunciator 36 which may be comprised of a light source such as a light emitting diode or an audible source such as a low input power piezoelectric buzzer, or both. Note that a speaker could also be used as an audible annunciator 36, by providing a conventional sound generator circuit and amplifier to drive the speaker. Annunciator 36 is activated by cycle timer 35 periodically in order to further conserve battery power.

In operation, power switch 29 periodically energizes transducer 16 as determined by enable timer 28. The transducer signal is amplified by amplifier 30 and the amplified signal compared to a threshold value by threshold comparator 31. If the amplified signal exceeds the threshold, then threshold comparator 31 generates a signal to latch on power switch 29 and thus transducer 16. Simultaneously, threshold comparator 31 enables converter 32 which also receives the amplified signal. When enabled, converter 32 generates a pulse signal having a frequency proportional to the magnitude of the amplified signal. These pulses are counter by counter 33 which stores a count representing the total volume of fluid having flowed to the filter. Thus, the transducer voltage signal is integrated by converter 32 and counter 33.

Counter 33 produces an output signal when the stored count advances to a predetermined count corresponding to the end of life of filter 12. Having reached the predetermined count, counter 33 preferably discontinues further counting and continues to generate the output signal until it is reset. Resetting may be accomplished, for example, by an operator activating a switch (not shown) when replacing filter 12. Alternatively, in some applications, it may be desirable to require concurrent battery replacement in order to cause reinitialization of electronics 20 on power-up.

In response to the output signal from counter 33, cycle timer 35 intermittently activates annunciator 36. Cycle timer 35 may optionally be responsive to a low battery detector 34 to activate annunciator 36 when the battery voltage falls below a predetermined level.

Figure 3:
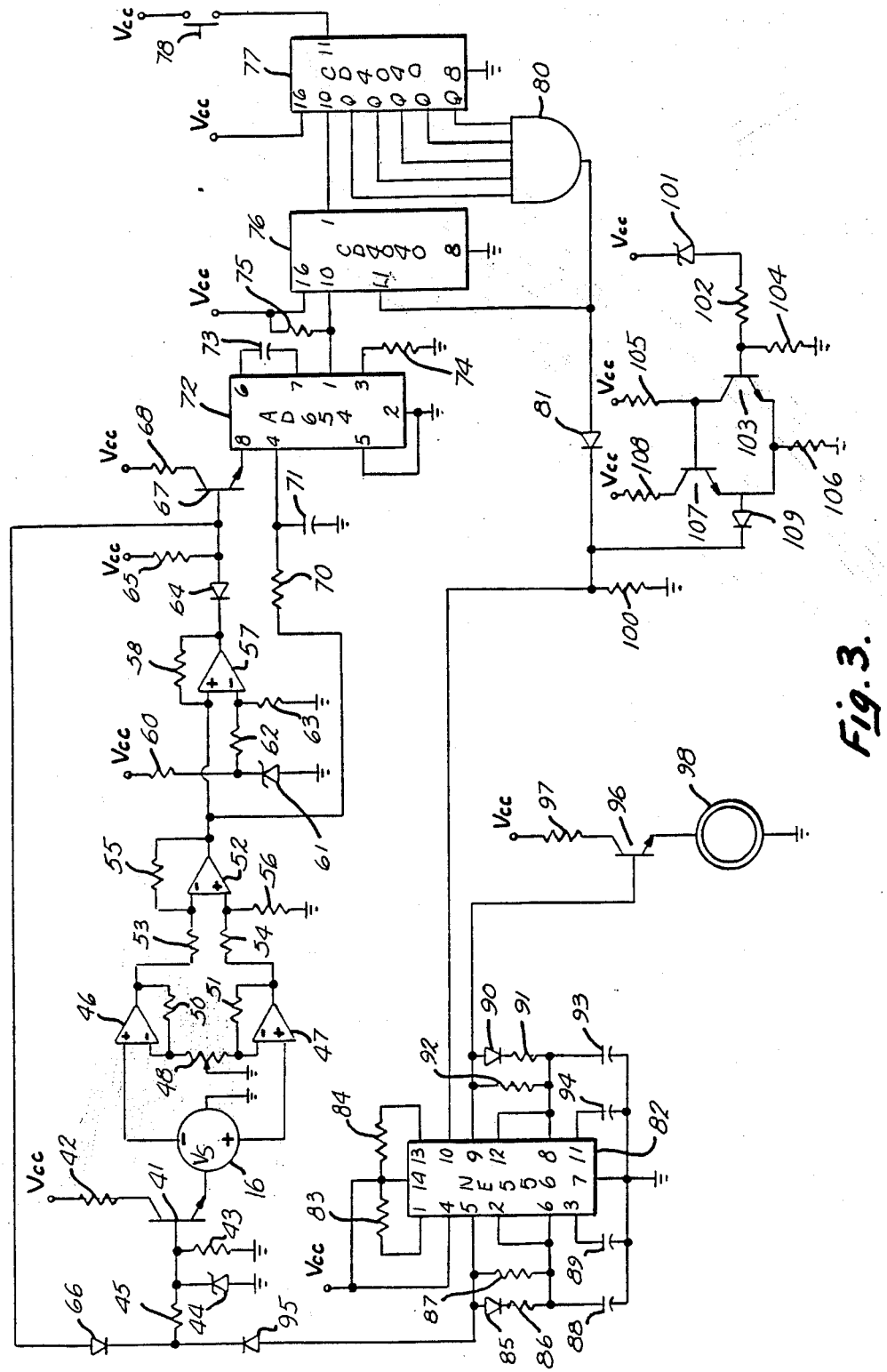
FIG. 3 is a schematic diagram of the circuit of FIG. 2.

Turning now to FIG. 3, a schematic diagram of a preferred implementation for electronics 20 is shown, which is intended for use with a piezoelectric differential pressure transducer 16 which may, for example, be the MPX 12 silicon pressure sensor available from Motorola Inc. A supply terminal $V_S$ of transducer 16 is connected to the emitter of a bipolar transistor 41. The collector of transistor 41 is coupled to supply voltage $V_{cc}$ through a resistor 42. The base of transistor 41 is coupled to ground (circuit common) through a resistor 43 and a zener diode 44 in parallel. The base of transistor 41 is also connected to a resistor 45 which is adapted to receive control signals for energizing transducer 16 as will be described below.

The output terminals of transducer 16 designated "−" and "+" are connected to the non-inverting inputs of operational amplifies 46 and 47, respectively. The inverting inputs of amplifiers 46 and 47 are connected through a potentiometer 48. A resistor 50 couples the inverting input of amplifier 46 to the output of amplifier 46 and a resistor 51 couples the inverting input of amplifier 47 to the output of amplifier 47.

The inverting input of an amplifier 52 is coupled to the output of amplifier 46 through a resistor 53. The non-inverting input of amplifier 52 is coupled to the output of amplifier 47 through a resistor 54 and to ground through a resistors 56. A resistor 55 couples the output of amplifier 52 to the inverting input of amplifier 52. The output of amplifier 52 provides a voltage signal proportional to the pressure differential sensed by transducer 16. This proportional output signal is provided to the non-inverting input of a threshold amplifier 57 and to a voltage-to-frequency converter chip 72 through a resistor 70.

Operational amplifier 57 is used as a threshold comparator. The inverting input of comparator 57 is connected to a voltage dividing network including a resistor 60 connected to supply voltage $V_{cc}$, a zener diode 61 and resistors 62 and 63. The output of comparator 57 is coupled to the non-inverting input of comparator 57 through a resistor 58 and is connected to the cathode of a diode 64. The anode of diode 64 is coupled to supply voltage $V_{cc}$ through a resistor 65. The junction of diode 64 and resistor 65 is connected to the anode of a diode 66 having its cathode connected to resistor 45. The junction of diode 64 and resistor 65 is further connected to the base of a bipolar transistor 67. The collector of transistor 67 is coupled to supply voltage $V_{cc}$ through a resistor 68 and the emitter of transistor 67 is connected to pin 8 of converter 62, shown as a AD654 voltage-to-frequency converter manufactured by Analog Devices Inc. Pin 4 of converter 72 is coupled to the output of comparator 52 through resistor 70 and to ground through a capacitor 71. An external capacitor 73 is coupled between pins 6 and 7 of converter 72. Pin 3 is coupled to ground through a resistor 74 and pins 2 and 5 are connected directly to ground. The converter output at pin 1 is coupled to supply voltage $V_{cc}$ through a resistor 75 and to the clock input of a counter circuit 76, shown for example as a CD4040 12-stage ripple-carry binary counter/divider available from RCA Corp. Pin 1 of counter circuit 76, representing the most significant digit of the counter, is connected to the input of a second counter circuit 77. Reset pin 11 of counter 77 is coupled via a reset line to a normally open pushbutton switch 78 which is also connected to power supply $V_{cc}$.

Selected outputs of counter 77 each designated Q are connected to respective inputs of an AND gate 80 to decode selected bits of the count contained in counter 77 representing an end of life condition. The output of AND gate 80 is connected to the anode of a diode 81. The cathode of diode 81 is coupled to ground through a resistor 100 and to input pin 10 of a dual timer circuit 82. The output of AND gate 80 is also connected to reset pin 11 of counter 76.

Dual timer circuit 82 is shown as an NE556 timer circuit available from Signetics, Incorporated. Pins 4 and 14 are connected to supply voltage $V_{cc}$. Pin 14 is coupled to pin 1 through a resistor 83 and to pin 13 through a resistor 84. Pin 5 is coupled to pin 6 through a series combination of a diode 85 and a resistor 86 connected in parallel with a resistor 87. Pins 2 and 6 are coupled to ground through a capacitor 88 and pin 3 is coupled to ground through a capacitor 89. Pin 9 is coupled to pin 8 through a diode 90 connected in series with a resistor 91 and through a resistor 92. Pins 8 and 12 are coupled to ground through a capacitor 93 and pin 11 is coupled to ground through a capacitor 94. Pin 7 is connected directly to ground.

One output of dual timer 82 at pin 5 is connected to the anode of a diode 95. The cathode of diode 94 is connected to resistor 45. The other output of dual timer 82 at pin 9 is connected to the base of a transistor 96. The collector of transistor 96 is coupled to supply voltage $V_{cc}$ through a resistor 97. The emitter of transistor 96 is connected to a piezoelectric buzzer 98.

A low battery detector circuit includes a zener diode 101 having its cathode connected to the supply voltage $V_{cc}$ and having its anode coupled to the base of a transistor 103 through a resistor 102. The base of transistor 103 is coupled to ground through a resistor 104. The collector of transistor 103 is connected to the base of a transistor 107 and is coupled to supply voltage $V_{cc}$ through a resistor 105. The emitter of transistor 103 is connected to the emitter of transistor 107 and is coupled to ground through a resistor 106. The collector of transistor 107 is coupled to supply voltage $V_{cc}$ through a resistor 108. The output of the low battery detector circuit is provided by the common connection of the emitters of transistors 103 and 107 which is coupled to input pin 10 of dual timer 82 through a diode 109.

In operation, dual timer circuit 82 provides pulses of predetermined duration and frequency at its output pin 5 depending on values selected for components 85-89. The timing pulses are coupled to bipolar transistor 41 off a power switch through diode 95 and resistor 45 to selectively energize transducer 40. The transducer signal is amplified by the dual differential pair 46 and 47 and by amplifier 52.

The output signal from amplifier 52 is compared with a threshold voltage at the inverting input of threshold comparator 57 determined by the reverse-bias breakdown voltage of zener diode 61, as reduced by the voltage divider formed by resistors 62 and 63. Until this threshold voltage is exceeded, the output of comparator 57 is low, thus forward biasing diode 64 and keeping the voltage at the junction of diode 64 and resistor 65 low. When the threshold voltage is exceeded, diode 64 becomes reverse biased and the signal to diode 66 and transistor 67 goes high. The high signal through diode 66 holds or "latches" on transistor 51 keeping transducer 16 continuously energized. The high signal to transistor 67 enables voltage-to-frequency converter 72, allowing the transducer signal to be integrated. Pulses from converter 72 are accumulated in counters 76 and 77. When a count corresponding to end of life of the filter is reached the selected bits from counter 77 designated Q are all at a high logic level, thus producing a high output from AND gate 80. The high signal from AND gate 80 resets counter 76 so that all counting is discontinued. The high signal further activates the second portion of dual timer 82 at pin 10. Components 90-94 determine the frequency and duration of the timed output signal for activating transistor 96 from point 9. The switching on and off of transistor 96 creates an audible signal from buzzer 98 indicating that the filter has reached the end of its useful life.

Indicator action of the buzzer or annunciator 98 will continue until counter 77 is reset. This may be accomplished by a normally open switch 78 which could be activated by an operator when the filter is replaced, for example. After resetting, a new end of life measurement would commence.

The low battery detector circuit operates to provide warning signal that battery failure is imminent by similarly activating the buzzer 98. When battery voltage, which supplies and correlates to the value of the supply voltage $V_{cc}$, is sufficient to keep $V_{cc}$ above a value determined by zener diode 101 and resistors 102 and 104, transistor 103 is turned on, thus effectively shorting the base of transistor 107 to its emitter. In this condition, transistor 107 is turned off and the current through transistor 103 is insufficient to develop a voltage across resistor 106 high enough to provide an output signal through diode 109. When battery voltage is no longer sufficient to keep transistor 103 turned on, transistor 107 turns on by virtue of base current through resistor 105. The higher current now flowing through resistor 106 generates a voltage which forward biases diode 1098 and activates annunciator 98 through dual timer 82.

The foregoing has described several embodiments of an end of life meter for a filter, which meter has no moving parts. The apparatus and method of operation of the meter are simple, reliable, economical and compact. It will be appreciated that the system applies to both liquid and gaseous fluids and that means other than a venturi can be employed to measure flow rate, such as a pitot tube.

In another embodiment of the invention, an instantaneous fluid flow meter is provided by using the output of either the amplifier 27 of FIG. 2 or the output of the voltage to frequency converter 29 of FIG. 2 as an indication of instantaneous fluid flow.

While preferred embodiments of the present invention have been shown and described herein, it will be understood that such embodiments are provided by way of example only. The embodiments have or may be readily adapted for other applications such as metering gasoline flow rates for automobiles, monitoring flow rates in braking or hydraulic systems, and metering of precise quantities of fluid as is filling beverage bottles. Also, while the electronics for the preferred embodiments have been described in terms of discrete, interconnected circuits, those in the art will appreciate that the circuitry's functions could be implemented in large part using a microprocessor-based controller or microcomputer with an internal or external analog-to-digital (A-t-D) input conversion device. The A-to-D device would be used to convert the analog input signal from the solid-state pressure transducer 16 or 40 into a digital input signal which could be processed by the microprocesor or computer to obtain an end of life indication by accumulating a value representing the total amount of fluid flow through the filter. Accordingly, it is intended that the appended claims, where not otherwise limited, cover all variations upon the preferred embodiments that fall within the spirit of the invention.

We claim:

1. A method for indicating the operating condition of an impurity filter receiving a variable fluid flow, comprising the steps of:
   generating a pressure differential proportional to the instantaneous rate of fluid flow;
   generating an electrical signal which is a function of said pressure differential;

integrating said signal to provide a representation of the total volume of fluid having passed through said filter; and activating an indicator when the magnitude of said representation has advanced to a value corresponding to a predetermined volume of fluid to be filtered;

wherein said signal generating step is conducted only at spaced intervals during periods when said pressure differential is below a predetermined threshold value and is conducted continuously when said pressure differential is above said predetermined threshold value.

2. The method of claim 1 wherein said pressure differential is generated by means of a venturi located in said flow.

3. The method of claim 1 wherein said indicator is an audible signal.

4. An apparatus for indicating the operation condition of an impurity filter receiving a variable fluid flow comprising:

pressure means adapted to contact said fluid flow for generating a pressure differential proportional to the instantaneous rate of flow;

A transducer exposed to said pressure differential and generating a first signal proportional to said instantaneous rate of flow;

a converter means coupled to said transducer for generating a pulse signal having a frequency proportional to the magnitude of said first signal;

counter means coupled to said converter means for storing a count representing a total volume of fluid having flowed through said filter and including means for providing an output signal when said counter has advanced to a predetermined count;

annunciator means responsive to said output signal for generating a humanly perceptible signal to indicate end of life of said filter; and first timer means coupled to said transducer for activating said transducer at spaced intervals; and threshold means coupled to said transducer and to said converter means for latching on said transducer and enabling said converter means when said first signal is above a predetermined voltage.

5. The apparatus of claim 4 further comprising:

second timer means coupling said counter means to said annunciator means for intermittently activating said annunciator means responsive to said output signal.

6. The apparatus of claim 4 wherein said counter means comprises a ripple counter coupled to said counter means for incrementing in response to said pulse signal and said means for providing an output signal includes decoder means coupled to said ripple counter to generate said output signal when said ripple counter contains said predetermined count.

7. The apparatus of claim 4 wherein said apparatus is adapted to receive operating power from a battery, said apparatus further comprising:

low battery detector means coupled to said annuciator means and adapted to be coupled to said battery for providing a warning signal to said annuciator means when the voltage from said battery is below a specified voltage, said annunciator means being responsive to said warning signal to generate said humanly perceptible signal.

8. The apparatus of claim 4 further comprising:

reset means coupled to said counter means for resetting said count when said filter is replaced.

9. The apparatus of claim 4 wherein said pressure means comprises a venturi.

10. Fluid purification apparatus comprising:

flow housing means for conducting a variable fluid flow therethrough;

impurity filtering means located within said flow housing means for absorbing organic contaminants and for filtering out particulates;

pressure means located within said flow housing means and adapted to contact said fluid flow for generating a pressure differential proportional to the instantaneous rate of flow of said fluid;

a piezoelectric differential pressure transducer exposed to said pressure differential for generating a voltage signal proportional to said instantaneous rate of flow;

voltage to frequency converter means coupled to said transducer for generating a pulse signal having a frequency proportional to the magnitude of said voltage signal;

counter means coupled to said converter means for storing a count representing the total volume of fluid having flowed through said filter and including means for producing an output signal when said count has advanced to a predetermined count;

annunciator means responsive to said output signal for generating a humanly perceptible signal to indicate end of life of said filter; and first timer means coupled to said transducer for activating said transducer at spaced intervals; and threshold means coupled to said transducer and to said converter means for latching on said transducer and enabling said converter means when said voltage signal is above a predetermined voltage.

11. The apparatus of claim 10 further comprising:

second timer means coupling said counter means to said annunciator means for intermittently activating said annunciator means responsive to said output signal.

12. The apparatus of claim 10 wherein:

said counter means comprises a ripple counter coupled to said converter means for incrementing in response to said pulse signal, and said means for producing an output includes decoder means coupled to said ripple counter to generate said output signal when said ripple counter contains said predetermined count.

13. The apparatus of claim 10 wherein said apparatus is adapted to receive operating power from a battery, said apparatus further comprising:

low battery detector means coupled to said annunciator means and adapted to be coupled to said battery for providing a warning signal to said annunciator means when the voltage from said battery is below a specified voltage, said annunciator means being responsive to said warning signal to generate said humanly perceptible signal.

14. The apparatus of claim 10 further comprising:

reset means coupled to said counter means for resetting said count when said filter is replaced.

15. The apparatus of claim 10 wherein said pressure means comprises a venturi.

16. The apparatus of claim 11 wherein said humanly perceptible signal is audible.

17. An apparatus for monitoring accumulated fluid flow therethrough by sensing and integrating a signal proportional to a differential pressure which is proportional to the rate of fluid flow comprising:

housing means for conducting a variable fluid flow therethrough;

generating means having no moving parts located within said housing means for generating a pressure differential proportional to the instantaneous rate of flow of said fluid through said housing means;

first solid-state electronic means for producing a value representing the total volume of fluid having flowed through said housing by integrating said signal over time;

second solid-state electronic means for producing an output signal when said value exceeds a predetermined value;

indicator means responsive to said output signal for generating a humanly perceptible signal in response to said output signal;

timer means for activating said generating means for generating said signal at spaced intervals thereby reducing the energy required to operate the apparatus; and threshold means for continuously enabling said generating means for generating said signal when the instantaneous rate of flow is detected as being above a predetermined value; and battery means within said housing means for supplying electrical power to the apparatus, whereby the apparatus can operate without being externally supplied with electricity;

low battery detector means for providing a warning signal to said indicator means when the voltage from said battery is below a specified voltage, and wherein said indicator responds to said warning signal by generating said humanly perceptible signal; and means for causing said humanly perceptible signal to be generated on a periodic, intermittent basis in response to the output signal and to the warning signal, thereby conserving battery power.

18. The apparatus of claim 17 wherein said means for generating said pressure differential includes a solid-state piezoelectric transducer, and said first and said second solid-state electronic means are located with said housing means.

19. An apparatus for monitoring the rate of fluid flow, comprising:

housing means for conducting a variable fluid flow therethrough;

a flow resistance disposed within said housing;

a solid-state piezoelectric transducer means having no moving parts located within said housing means for generating a voltage proportional to the instantaneous rate of flow of said fluid through said housing means;

solid-state electronic means for producing a value representing the rate of fluid flowing through said housing;

timer means for activating said piezoelectric means at spaced intervals thereby reducing the energy required to operate the apparatus; and threshold means for continuously enabling said piezoelectric means when the instantaneous rate of flow is detected as being above a predetermined value.

20. The apparatus of claim 19 further comprising:

battery means within said housing means for supplying electrical power to the apparatus, whereby the apparatus can operate without being externally supplied with electricity;

low battery detector means for providing a warning signal to said indicator means when the voltage from said battery is below a specified voltage, and wherein said indicator responds to said warning signal by generating said humanly perceptible signal.

21. The apparatus of claim 20 further comprising:

means for causing a humanly perceptible signal to be generated on a periodic, intermittent basis in response to the output signal and to the warning signal, thereby conserving battery power.

* * * * *